J. S. COPELAND.
BACK PEDALING BRAKE.
APPLICATION FILED JUNE 23, 1897.
1,234,137.
Patented July 24, 1917.
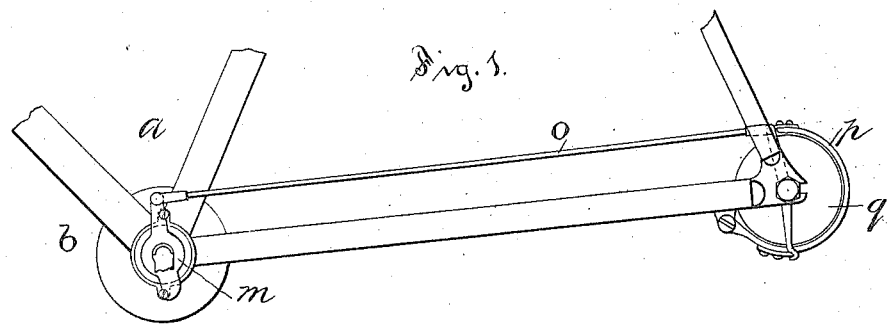
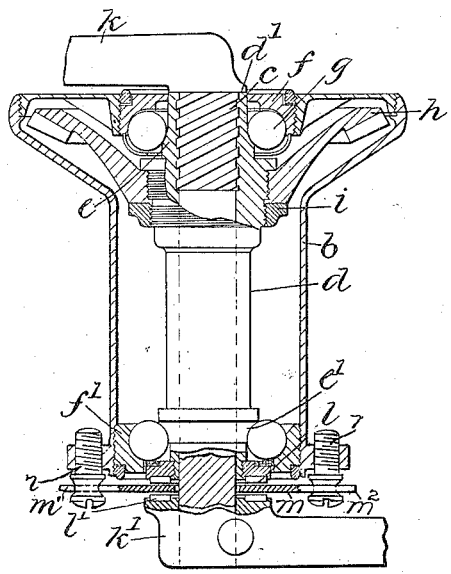
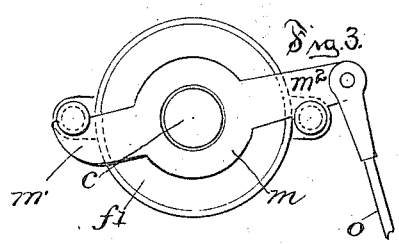
Witnesses:
William H. Barker
Arthur B. Jenkins
Inventor:
James S. Copeland.
by Chas. L. Burden
Attorney

UNITED STATES PATENT OFFICE.

JAMES S. COPELAND, OF HARTFORD, CONNECTICUT, ASSIGNOR, BY MESNE ASSIGNMENTS, TO THE NEW DEPARTURE MANUFACTURING COMPANY, OF BRISTOL, CONNECTICUT, A CORPORATION OF CONNECTICUT.

BACK-PEDALING BRAKE.

1,234,137.　　　　Specification of Letters Patent.　　Patented July 24, 1917.

Application filed June 23, 1897.　Serial No. 641,977.

*To all whom it may concern:*

Be it known that I, JAMES S. COPELAND, a citizen of the United States, and resident of Hartford, in the county of Hartford and State of Connecticut, have invented certain new and useful Improvements in Back-Pedaling Brakes, of which the following is a full, clear, and exact description, whereby any one skilled in the art can make and use the same.

My invention relates to and is more particularly adapted for use in connection with the driving mechanism of bicycles and like vehicles in which a crank shaft is used in the power transmitting part of the vehicle, and the object of my invention is to provide means for applying a brake to retard the forward movement of the vehicle whenever the crank shall be subjected to pressure in a reverse direction while the vehicle is moving forward.

Referring to the drawings:

Figure 1 is a view in side elevation illustrating part of the frame of a bicycle with my invention applied;

Fig. 2 is a detail view in central longitudinal section on enlarged scale, through the crank shaft bracket, illustrating the means of producing a lateral movement of the crank shaft to bring the brake into action and with parts broken away to show construction; and Fig. 3 is a view in side elevation of the end of the bracket showing the form of the washer.

In the accompanying drawings the letter $a$ denotes a portion of the frame of a bicycle of the chainless type, in this case one driven by a series of bevel gears and a connecting shaft.

A crank shaft bracket $b$ supports the crank shaft $c$, a sleeve $d$ being fitted upon the crank shaft which has a limited lateral movement within the sleeve.

The sleeve is suitably supported for rotation in the bracket and for this purpose cones $e$ $e^1$ may be secured to the sleeve near its opposite ends and ball cases $f$ $f^1$ may be secured within the ends of the bracket, balls $g$ being interposed between the cones and the cases as usual.

A gear wheel $h$ is fastened to the sleeve $d$ as by means of a thread on an enlarged portion of the sleeve, on to which the threaded hub of the gear wheel is screwed and where it is held against unscrewing by means of a jam nut $i$ also secured to a threaded portion of the sleeve. By this means the sleeve and the gear wheel are firmly fastened together so that the sleeve in its turning movement upon its axis causes the gear wheel to turn and a driving force applied to the gear wheel will cause the sleeve to turn with it.

The crank shaft and the sleeve in the form of structure herein illustrated engage with one another in such a manner as to permit a limited rotary movement of one with respect to the other and also a limited lateral movement of the parts on each other. Any construction which includes an inclined or obliquely disposed shoulder on one part and a coöperating projection or shoulder on the other part arranged to enable this result to be accomplished, will come within the scope of the invention, but I prefer the construction shown in the drawing, in which the crank shaft has, near the crank $k$, a screw thread which engages a corresponding threaded portion in the sleeve $d$, the thread being of a quick pitch so that pressure that would cause a relative rotary movement of the crank $k$ through a small arc will cause a comparatively large lateral movement of the crank shaft upon the sleeve and in the line of its axis.

When force is applied to the crank to drive the shaft in a direction which will impart a forward movement to the vehicle, as a bicycle, a shoulder at the base of this thread $d^1$, formed preferably by the hub or inner face of the crank arm $k$, strikes against the end of the sleeve and the shaft and sleeve rotate together. As soon as pressure in the reverse direction is applied to the crank, as by back pedaling, the forward movement of the vehicle will tend to continue the rotary movement of the gear wheel in the forward direction, and the result is that the shaft unscrews and runs outward from the said threaded end of the sleeve.

The opposite end of the sleeve or a part secured thereto is provided with a non-metallic face or brake shoe $l$ and the inner surface of the crank hub $k^1$ is also preferably provided with a non-metallic bearing surface or brake shoe $l^1$, a loose washer $m$ being rockably supported upon the shaft $c$, between these two surfaces. When in inactive position the arms $m^1$, $m^2$ of the said washer or disk bear against screw bolts $n$.

The plate or washer $m$ preferably has freedom for a slight lateral movement and the brake shoes $l$ and $l^1$ are adapted to press against the opposite faces of the plate when the lateral movement of the sleeve takes place as above referred to and in such manner as to retard the rotary movement of the sleeve and its connected gear wheel and consequently also to retard the forward movement of the vehicle.

Upon back pedaling, the washer $m$ is given rotary movement caused by the contact of the rapidly revolving end of the sleeve $d$ with this plate or washer when the crank shaft is moved sidewise. The rotary movement of this plate upon the supporting crank shaft is obviously in the direction of rotation of the sleeve, or forward, and by connecting the outer end of the plate arm $m^2$, as by means of the rod $o$, with a band brake $p$ applied to the hub $q$ of the rear wheel of the vehicle, a double brake action is secured automatically, the rocking movement of the washer $m$ applying the brake $p$ and the washer itself acting as a brake upon the driving sleeve $d$.

A material feature of advantage of this construction with respect to the frictional brake or washer $m$ and its related parts is that the lateral movement of the crank shaft and the bringing into action of this frictional brake $m$ does not throw any strain upon the balls in a direction lengthwise of the axis of the crank shaft, this objectionable thrust upon the ball bearings being a defect in prior brakes of this class.

The plate $m$ constitutes in effect an operating member for the brake on the hub of the drive wheel.

It will be noted that the direction of rotation or the angular movement of the brake operating member $m$ in applying the brake, coincides with the direction of rotation of the drive wheel and its hub; thus the forward movement of the brake operating member and rod draws the free end of the flexible brake forward, whereby the pressure on the free end of said brake in applying the brake, is exerted in the direction of rotation of the wheel.

By this construction, the forward rotation of the wheel enhances the braking pressure of the brake applied thereto. The arrangement it will also be noted not only avoids the necessity of extending the connecting rod so as to cross the reach bar of the frame, but b ings the said bar above the frame where it is out of the way and permits of a very compact and convenient assemblage.

I claim as my invention:

1. In combination with the frame of a vehicle, a wheel mounted in the frame, a band brake operatively connected with the wheel, a sleeve rotatably mounted in the frame, a shaft located within the sleeve to rotate therewith but having a longitudinal movement thereof, means for causing said longitudinal movement, means for causing simultaneous rotation of the shaft and sleeve, a rotatable washer inclosed between the shaft and sleeve to support the thrust of said parts in their longitudinal movement, and a rod connecting the band brake and washer.

2. In combination with the frame of a vehicle, a wheel mounted in the frame, a band brake operatively connected with said wheel, rotating members adjacent to the crank shaft and bearing friction surfaces, means operated by back pedaling for causing one of the friction surfaces to approach the other, a loose part frictionally clamped between said two members, and means connecting said loose part and the band brake, all substantially as described.

3. In combination in a bicycle, a frame, a driving wheel, a band brake operatively connected with said driving wheel hub, a crank shaft mounted in a crank bracket on the frame, a loose member supported on the crank shaft, a rotary member, means operated by back pedaling for frictionally engaging the loose member and rotary member, and a rod connecting said loose member with the back of the band brake on the driving wheel, all substantially as described.

4. The combination with the frame of a vehicle, a crank shaft and wheel hub mounted in the frame, driving connections between the crank shaft and wheel hub, a brake for retarding the rotation of the crank shaft, a brake for retarding the rotation of the wheel hub, connections between said brakes whereby they operate in unison, and means controlled by the crank shaft for applying the brakes when back pressure is applied to the crank shaft.

5. In a bicycle, independent crank shaft and drive wheel hub, driving connections between the shaft and wheel hub, separate brakes for said shaft and said wheel, connections between the brakes whereby they operate in unison, and brake operating means interposed in the driving connections between the shaft and hub.

6. In combination with the frame of a vehicle, a wheel mounted in the frame, a crank shaft mounted in the frame, operative connections between the crank shaft and driving wheel, a brake appurtenant to the crank shaft and including a laterally movable and partially rotatable member adapted to be operated by back pedaling, a brake appurtenant to the driving wheel, and a connection between said brakes for causing simultaneous action.

7. In combination with the frame of a vehicle, a wheel supported in the frame, driving means supported on the frame, a friction brake appurtenant to the driving means, a brake appurtenant to the wheel, and connections with each of said brakes to operate them on the application of backward pressure to the crank shaft.

8. In combination with the frame of a vehicle, a wheel mounted in the frame, a brake supported in operative relation to the wheel, driving and braking means supported in the frame and including a movable member held in the frictional grasp of the driving and brake means, and a connecting rod connecting said movable member and the brake appurtenant to the wheel.

9. In combination with a vehicle frame having a bracket, a shaft and sleeve supported in the bracket and having independent lateral movement and opposing contact faces, a brake member interposed between the contact faces and having a free lateral and limited rotary movement, a wheel supported in the frame, a brake appurtenant to said wheel, and connections between said brake member and the brake appurtenant to the wheel.

10. In combination with the frame of a vehicle, a wheel supported therein, a band brake appurtenant to said wheel, a crank shaft and a sleeve supported in the frame and having independent lateral movement and opposing contact faces, a brake member interposed between said contact faces and having a free lateral and limited rotary movement, and a connecting rod extending between the band brake and said brake member.

11. In a vehicle brake, the combination of a driven member, a driving and brake member revolubly mounted with respect to the driven member and adapted to move longitudinally with respect thereto, a co-acting brake surface, a supplemental brake, and connections between the before mentioned brake surface and the movable member of the supplemental brake.

12. In a velocipede or the like, the combination with the frame, the angularly movable driving pedals, and the driven traction-wheel and its hub, of a brake at said hub having means for non-rotatably connecting it to the machine frame and movable with respect to said hub and to said frame into and out of position to brake said wheel, a threaded part connected to said driving pedals to move angularly therewith, a complementary threaded part separate from said hub and operative between the same and said first-mentioned threaded part, whereby angular movement between said threaded parts effects relative lateral shifting between them, means for operative driving connection between said complementary threaded part and said hub, and means for brake-operating connection between said complementary threaded part and said brake at said hub upon the above-indicated lateral shifting between said threaded parts into one of their lateral relationships; substantially as described.

13. In a vehicle brake, the combination of a driven member, a driving and brake member revolubly mounted with respect to the driven member and adapted to move longitudinally with respect thereto, a yielding co-acting brake surface, a supplemental brake, and connections between the yielding brake surface and the movable member of the supplemental brake.

JAMES S. COPELAND.

Witnesses:
HARRIE E. HART,
HERMANN F. CUNTZ.